United States Patent
Calavrezo et al.

(10) Patent No.: US 8,891,376 B1
(45) Date of Patent: Nov. 18, 2014

(54) QUANTIZED CONGESTION NOTIFICATION—DEFENSE MODE CHOICE EXTENSION FOR THE ALTERNATE PRIORITY OF CONGESTION POINTS

(71) Applicant: International Business Machines Corporation, Armonk, NY (US)

(72) Inventors: Dan-Alexandru Calavrezo, Bucharest (RO); Keshav G. Kamble, Fremont, CA (US); Mihail-Liviu Manolachi, Bucharest (RO); Andrei S. Pistirica, Bucharest (RO)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/047,307

(22) Filed: Oct. 7, 2013

(51) Int. Cl.
*H04L 1/00* (2006.01)
*H04L 12/833* (2013.01)
*H04L 12/801* (2013.01)
*H04L 12/28* (2006.01)

(52) U.S. Cl.
CPC ............ *H04L 47/2458* (2013.01); *H04L 47/12* (2013.01)
USPC .......................................... 370/235; 370/412

(58) Field of Classification Search
CPC combination set(s) only.
See application file for complete search history.

(56) References Cited

U.S. PATENT DOCUMENTS

| | | | |
|---|---|---|---|
| 5,912,877 A | 6/1999 | Shirai et al. | |
| 6,839,321 B1 | 1/2005 | Chiruvolu | |
| 8,441,922 B1 | 5/2013 | McGlaughlin et al. | |
| 2008/0259798 A1 | 10/2008 | Loh et al. | |
| 2011/0235518 A1* | 9/2011 | Halabi et al. | 370/237 |
| 2012/0020219 A1 | 1/2012 | Kamiya et al. | |
| 2012/0140626 A1* | 6/2012 | Anand et al. | 370/235 |
| 2012/0275307 A1* | 11/2012 | Godbole et al. | 370/236 |
| 2013/0114412 A1 | 5/2013 | Crisan et al. | |

OTHER PUBLICATIONS

Rong Pan et al., "QCN: Quantized Congestion Notification", http://www.stanford.edu/~balaji/presentations/au-prabhakar-qcn-description.pdf, pp. 1-26.
IEEE Std 802.1Q™-2011, (Revision of IEEE Std 802.1Q-2005), "Media Access Control (MAC) Bridges and Virtual Bridge Local Area Networks", Aug. 31, 2011, pp. 1-1320.

* cited by examiner

*Primary Examiner* — Clemence Han
(74) *Attorney, Agent, or Firm* — Zilka-Kotab, PC

(57) ABSTRACT

A method, computer program product and computer system to extend Quantized Congestion Notification protocol to receive a signal to activate Quantized Congestion Notification with a hybrid congestion notification control choice, the signal additionally including an alternate priority value. The per-port per-priority protocol variables and per-device per-Congestion-Notification-Priority-Value protocol variables are set to automatically assign a defense mode. The per-port per-priority protocol variables and a per-device per-Congestion-Notification-Priority-Value protocol variables are set to manually assign an alternate priority value.

20 Claims, 5 Drawing Sheets

| (Per-port per-priority) cnpdDefModeChoice 32.4.1 | (Component per-priority) cncpDefModeChoice 32.3.1 | CND defense mode is selected by | Alternate priority is selected by |
|---|---|---|---|
| cpcAdmin | any | (Per-port per-priority) cnpdAdminDefenseMode 32.4.2 | (Per-port per-priority) cnpdAlternatePriority 32.4.6 |
| cpcAuto | any | (Per-port per-priority) cnpdAutoDefenseMode 32.4.3 | (Component per-priority) cncpAutoAltPri 32.3.3 |
| cpcHybrid 210 | any | (Per-port per-priority) cnpdAutoDefenseMode 32.4.3 214 | (Per-port per-priority) cnpdAlternatePriority 32.4.6 216 |
| cpcComp | cpcAdmin | (Component per-priority) cncpAdminDefenseMode 32.3.4 | (Component per-priority) cncpAlternatePriority 32.3.2 |
| cpcComp | cpcAuto | (Per-port per-priority) cnpdAutoDefenseMode 32.4.3 | (Component per-priority) cncpAutoAltPri 32.3.3 |
| cpcComp 220 | cpcHybrid 222 | (Per-port per-priority) cnpdAutoDefenseMode 224 32.4.3 | (Component per-priority) cncpAlternatePriority 226 32.3.2 |

Table 32-2 (Updated)
CND defense mode selection managed object overrides
(IEEE 802.1Q™-2011)

Table 32-2 (Updated)
CND defense mode selection managed object overrides (IEEE 802.1Q™-2011)

Table 32-3 (Updated)
Determining cnpdIsAdminDefMode and cnpdDefenseMode (IEEE 802.1Q™-2011)

QUANTIZED CONGESTION NOTIFICATION—DEFENSE MODE CHOICE EXTENSION FOR THE ALTERNATE PRIORITY OF CONGESTION POINTS

BACKGROUND

The present invention relates generally to networks and more specifically to a method, computer program and computer system extending Quantized Congestion Notification (QCN) defense mode choice protocols.

Quantized Congestion Notification protocols define a congestion management mechanism of long lived data flows. Quantized Congestion Notification includes capabilities for detecting and mitigating queue congestion for selected classes of network traffic in a Virtual Bridged Local Area Network (VLAN). Quantized Congestion Notification depends on the formation of a cooperating set of devices including congestion-aware bridge components and congestion-aware end stations to achieve a reduction in frame loss. By partitioning the bridge component and end station resources, frames sourced or sunk by non-cooperating end stations or non-cooperating bridge components may be carried with minimal contention for those resources. The Institute of Electrical and Electronics Engineers (IEEE) has produced a quantized congestion notification standard establishing protocols for tagging frames, protocols for the operation of cooperating bridges and end stations, protocols for the administration of topologies and protocols for QCN defense mode choice.

Protocols for QCN defense mode choice may be found in, for example, IEEE Standard 802.1Q™-2011, entitled IEEE Standard for Local and metropolitan area networks—Media Access Control (MAC) Bridges and Virtual Bridge Local Area Networks, published by the IEEE Computer Society, Aug. 31, 2011, hereby incorporated by reference.

SUMMARY

In one aspect, a method to extend Quantized Congestion Notification protocol includes receiving a signal where the signal activates Quantized Congestion Notification with a hybrid congestion notification control choice and the signal additionally includes an alternate priority value. The per-port per-priority protocol variables and per-device per-Congestion-Notification-Priority-Value protocol variables are set to automatically assign a defense mode. The per-port per-priority protocol variables and a per-device per-Congestion-Notification-Priority-Value protocol variables are set to manually assign an alternate priority value.

In another aspect, a computer program product to extend Quantized Congestion Notification protocol, the computer program product comprising one or more computer-readable tangible storage devices and program instructions stored on at least one of the one or more computer-readable tangible storage devices. The computer program product includes program instructions to receive a signal where the signal activates Quantized Congestion Notification with a hybrid congestion notification control choice and the signal additionally includes an alternate priority value. The computer program product further includes program instructions to set the per-port per-priority protocol variables and per-device per-Congestion-Notification-Priority-Value protocol variables to automatically assign a defense mode. The computer program product further includes program instructions to set the per-port per-priority protocol variables and a per-device per-Congestion-Notification-Priority-Value protocol variables to manually assign an alternate priority value.

In another aspect, a computer system to extend Quantized Congestion Notification protocol, the computer system comprising one or more processors, one or more computer readable memories, one or more computer readable tangible storage devices, and program instructions stored on at least one of the one or more storage devices for execution by at least one of the one or more processors via at least one of the one or more memories. The computer system includes program instructions to receive a signal where the signal activates Quantized Congestion Notification with a hybrid congestion notification control choice and the signal additionally includes an alternate priority value. The computer system further includes program instructions to set the per-port per-priority protocol variables and per-device per-Congestion-Notification-Priority-Value protocol variables to automatically assign a defense mode. The computer system further includes program instructions to set the per-port per-priority protocol variables and a per-device per-Congestion-Notification-Priority-Value protocol variables to manually assign an alternate priority value.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
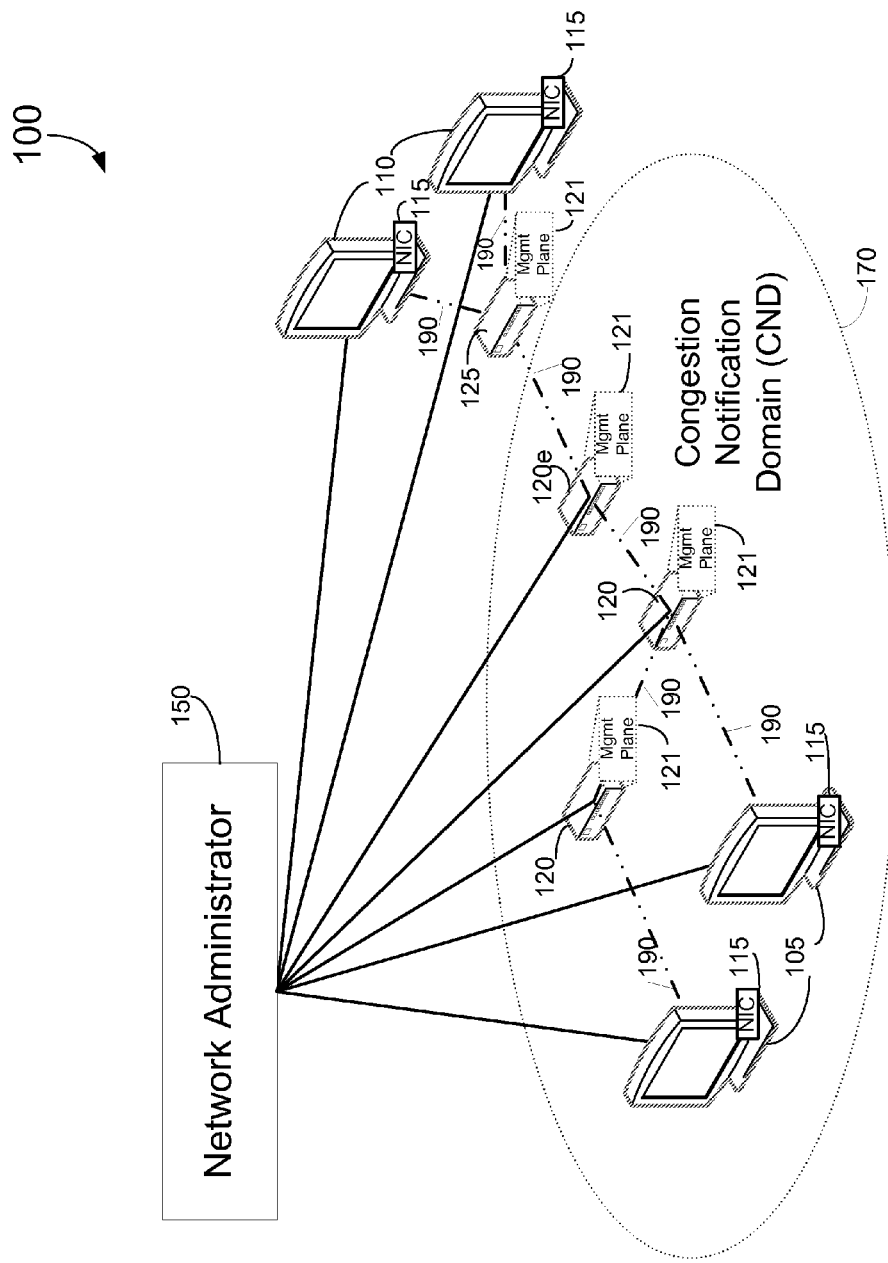
FIG. 1 is a schematic block diagram depicting an exemplary network system, in accordance with an embodiment of the present invention.

Referring now to FIG. 1, a schematic block diagram depicting an exemplary network system 100 in which a congestion notification domain (CND) 170 is configured, in accordance with an embodiment of the present invention. This exemplary network is illustrative rather than limiting.

Quantized Congestion Notification (QCN) protocol may establish a signaling technique used by data transmission systems to communicate the status of network congestion. Cooperating end stations 105 that are transmitting data across a network rely on congestion notification to determine the transmission rate of data. Congestion Notification protocols may provide a means for a cooperating, congestion-aware bridge component 120 to notify a cooperating, congestion-aware end station 105 of congestion, thus allowing the cooperating, congestion-aware end station 105 to reduce the data transmission flow rate.

A network administrator 150, using network administrative protocols, may configure some or all of the network devices in a CND 170. The CND 170 may include cooperating, congestion-aware bridge components 120 and cooperating, congestion-aware end stations 105 configured to transmit quantized congestion notification data only to other congestion-aware bridge components 120 and congestion-aware end stations 105 in the same CND 170. The CND 170 may also include congestion-aware bridge components 120e, herein referred to as "edge components" that may additionally transmit data to and from non-cooperating devices configured outside the CND 170.

All network connections (ports) on devices within a CND 170 may have a QCN defense mode specified. The QCN defense mode specifies the behavior of the port for congestion control within the CND 170. A congestion notification domain defense protocol may establish how each edge component 120e in the CND 170 may handle data transmissions from non-cooperating devices 110, 125 configured outside the CND 170. Congestion notification domain defense protocols may include assigning a defense mode value and alternate priority value for each priority value of each network connection in an edge component 120e. The defense mode value may identify the device as an edge component. The alternate priority value may identify a priority value to be reassigned to transmission data arriving in the CND 170.

The network administrator 150 may, as described in IEEE Standard 802.1Q™ for a QCN defense mode choice protocol, set the defense mode value and alternate priority value of cooperating, congestion-aware bridge components 120, 120e and cooperating, congestion-aware end stations 105 either automatically or manually. The "automatic" control choice option sets both the defense mode value and the alternate priority value automatically. The network administrator may set both values manually with the "manual" control choice option. When set automatically, the cooperating, congestion-aware end stations 105 and cooperating, congestion-aware bridge components 120, 120e may communicate using a Link Layer Discovery Protocol (LLDP) to automatically establish the defense mode value for each port. The automatically determined alternate priority value may be determined by an algorithm specified in the protocols of IEEE Standard 802.1Q™.

Automatically determined alternate priority values may not be optimal values for some networks and may actually create quality of service (QoS) disruptions if the automatically determined alternate priority value conflicts with a locally defined priority value for other workloads or workload policies within the network. The QoS disruptions resulting from QCN activation with the "automatic" control choice option may cause the network administrator 150 to switch from the "automatic" control choice option to the "manual" control choice option and manually set the alternate priority in all edge components 120e to a value appropriate for the network. In addition, this switch to the "manual" control choice option may cause the network administrator 150 to also manually configure the defense mode value for every port in the CND 170. Manually configuring ports at a global level may set all the ports to the same defense mode. Global level configuration may not create a correct configuration for all ports in the CND 170. Manually configuring ports at a local level may require the network administrator 150 to examine each port in the network configuration, check the network topology and manually set the defense mode value, contradicting the goal of automatic configuration.

In an embodiment of the present invention, the QCN defense mode choice protocol may be extended to give the network administrator 150 a third control choice, a "hybrid" control choice option, for setting the defense mode value and alternate priority value of cooperating, congestion-aware bridge components 120, 120e and cooperating, congestion-aware end stations 105. In an embodiment of the present invention, the third control choice, the "hybrid" control choice option, may automatically set the defense mode value, as in the "automatic" control choice option, while allowing the network administrator 150 to specify the alternate priority value set in each cooperating, congestion-aware bridge component 120, 120e and cooperating, congestion-aware end station 105 in the CND 170. The "hybrid" control choice option may allow the tedious determination of the defense mode value to be handled automatically by the LLDP, while allowing the network administrator 150 to specify an appropriate alternate priority for the specific network configuration and workload and thus avoiding QoS disruptions.

With continuing reference to FIG. 1, in accordance with an embodiment of the present invention, the CND 170 may include one or more cooperating, congestion-aware end stations 105, wherein some of the one or more cooperating, congestion-aware end stations 105 may be configured to transmit a congestion notification frame and some of the one or more cooperating, congestion-aware end stations 105 may be configured to receive a congestion notification frame. The CND 170 may also include one or more cooperating, congestion-aware bridge components 120 arranged in a network between the cooperating, congestion-aware end stations 105 and one or more cooperating, congestion-aware edge components 120e configured to transmit data to and from non-cooperating devices 110, 125 outside the CND 170. The cooperating, congestion-aware bridge components 120, 120e may be devices including, but not limited to, switches and software bridges configured as congestion points within the CND 170. A network administrator 150 may connect to the one or more cooperating, congestion-aware end stations 105 and the one or more cooperating, congestion-aware bridge components 120, 120e within the CND 170. The network administrator 150 may also connect to one or more non-cooperating end stations 110 and one or more non-cooperating bridge components 125 outside the CND 170. The non-cooperating end stations 110 and non-cooperating bridge components 125 may be devices that are not congestion-aware or may, alternately, be congestion-aware devices configured in a different CND. In either case, the non-cooperating devices may not send or receive congestion notification frames to or from the CND 170 and may not be mapped to the same priority value. The cooperating and non-cooperating devices may be connected by a plurality of network connections 190.

The network administrator 150 may connect directly to the end stations 105, 110 and bridge components 120, 120e, 125 through the management plane 121 of bridge components 120, 120e, 125 or through the network interface card (NIC) 115 of the end stations 105, 110 or may connect remotely from one or more administrative computers using network management protocols supported by network equipment. The network administrator 150 may configure the network communication relationship including, but limited to, a plurality of network connections 190, a plurality of both cooperating and non-cooperating bridge components 120, 120e, 125 and a plurality of both cooperating and non-cooperating end stations 105, 110. The network administrator 150 may determine which congestion-aware end stations 105 and congestion-aware bridge components 120, 120e are to be configured in a CND 170 and what workloads the CND 170 may handle. In an embodiment of the present invention, the network administrator 150 may choose to set the defense mode values and alternate priority value for each cooperating, congestion-aware end station 105 and each cooperating, congestion-aware bridge component 120, 120e in the CND 170 using a congestion notification control choice protocol option of "automatic", "manual" or "hybrid".

Figure 2A:
FIG. 2a is an exemplary table of congestion notification domain defense mode selection managed object overrides, in accordance with an embodiment of the present invention.

Now referring to FIG. 2a, an exemplary table 200 of CND defense mode selection managed object overrides, including a new "hybrid" congestion notification control choice option, in accordance with an embodiment of the present invention. Table 200 is based on TABLE 32-2 in the IEEE 802.1Q™-2011 standard as it may appear with the addition of the "hybrid" congestion notification control choice option included.

For each port in a congestion-aware end station or congestion-aware bridge component, and for each priority value for which a set of congestion notification per-Congestion-Notification-Priority-Value (CNPV) variables exist, IEEE 802.1Q™-2011 teaches there is an instance of a CND defense per-Port per-CNPV variable. IEEE 802.1Q™-2011 additionally teaches variable cnpdDefModeChoice (IEEE 802.1Q™-2011 section 32.4.1) is an enumerated value specifying how the CND defense mode and the alternate priority of the port for this priority is to be determined. In an embodiment of the present invention, an exemplary value of cpcHybrid 210 in variable cnpdDefModeChoice (IEEE 802.1Q™-2011 section 32.4.1) may indicate the port's CND defense mode variable cnpdAutoDefenseMode (IEEE 802.1Q™-2011 section 32.4.3) for this priority 214 may be controlled by the LLDP and the Congestion Notification TLV. Congestion notification control choice option, "hybrid", may additionally indicate the alternate priority 216 may be obtained from variable cnpdAlternatePriority (IEEE 802.1Q™-2011 section 32.4.6).

Congestion-aware end stations and congestion-aware bridge components may have a set of Congestion Notification (CN) component variables to control the overall operation of congestion notification for each priority value. These component variables are included in the CN component managed object. IEEE 802.1Q™-2011 teaches (section 32.4.1) when variable cnpdDefModeChoice (IEEE 802.1Q™-2011 section 32.4.1) is cpcComp 220, the port's CND defense mode for this priority is controlled by variable cncpDefModeChoice (IEEE 802.1Q™-2011 section 32.3.1). IEEE 802.1Q™-2011 section 32.3.1 teaches variable cncpDefModeChoice (IEEE 802.1Q™-2011 section 32.3.1) is an enumerated value specifying how the CND defense mode and alternate priority for all ports for this Congestion notification per-CNPV are to be selected. In an embodiment of the present invention, an exemplary value of cpcHybrid 222 in variable cncpDefModeChoice (IEEE 802.1Q™-2011 section 32.3.1) may indicate the port's CND defense mode variable cnpdAutoDefenseMode (IEEE 802.1Q™-2011 section 32.4.3) for this priority 224 may be controlled by the LLDP and the Congestion Notification TLV. Congestion notification control choice option, "hybrid", may additionally indicate the alternate priority 226 may be obtained from variable cncpAlternatePriority (IEEE 802.1Q™-2011 section 32.3.2).

It should be noted that in an embodiment of the present invention, variable cnpdAutoDefenseMode (IEEE 802.1Q™-2011 section 32.4.3) may operate for a CNPV when variable cnpdDefModeChoice (IEEE 802.1Q™-2011 section 32.4.1) has the exemplary value of cpcHybrid 210. It should also be noted that in an embodiment of the present invention, variable cnpdAlternatePriority (IEEE 802.1Q™-2011 section 32.4.6) may operate when variable cnpdDefModeChoice (IEEE 802.1Q™-2011 section 32.4.1) has the exemplary value of cpcHybrid 210.

Figure 2B:
FIG. 2b is an exemplary table of input to a congestion notification domain defense state machine, in accordance with an embodiment of the present invention.

Now referring to FIG. 2b, an exemplary table 240 of input to a congestion notification domain defense state machine, which includes the new "hybrid" congestion notification control choice option, in accordance with an embodiment of the present invention. Table 240 is based on TABLE 32-3 in the IEEE 802.1Q™-2011 standard as it may appear with the addition of the "hybrid" congestion notification control choice option included.

For each port in a congestion-aware end station or congestion-aware bridge component, and for each priority value for which a set of congestion notification per-CNPV variables exist, IEEE 802.1Q™-2011 teaches there is an instance of a variable cnpdIsAdminDefMode (IEEE 802.1Q™-2011 section 32.4.13) which is a Boolean variable derived from the managed objects, indicating to the Congestion Notification Domain defense state machine (IEEE 802.1Q™-2011 section 32.6) whether or not the CND defense mode is being forced to a particular state by the managed objects. A Boolean value of FALSE may indicate the CND defense mode is not being forced to a particular state but may, instead, be determined by the LLDP protocol. Since a Boolean value of FALSE may not force a particular state, the location to obtain the forced state may be undefined. In an embodiment of the present invention, variable cnpdIsAdminDefMode (IEEE 802.1Q™-2011 section 32.4.13) may be set to FALSE when variable cnpdDefModeChoice (IEEE 802.1Q™-2011 section 32.4.1) is set to the exemplary value of cpcHybrid 210. Variable cnpdIsAdminDefMode (IEEE 802.1Q™-2011 section 32.4.13) may also be set to FALSE when variable cnpdDefModeChoice (IEEE 802.1Q™-2011 section 32.4.1) is set to value cpcComp 220 combined with variable cncpDefModeChoice (IEEE 802.1Q™-2011 section 32.3.1) having the exemplary value of cpcHybrid 222. With variable cnpdIsAdminDefMode (IEEE 802.1Q™-2011 section 32.4.13) set to FALSE 218, 228, the forced state location 219, 229 may be undefined.

Figure 3:
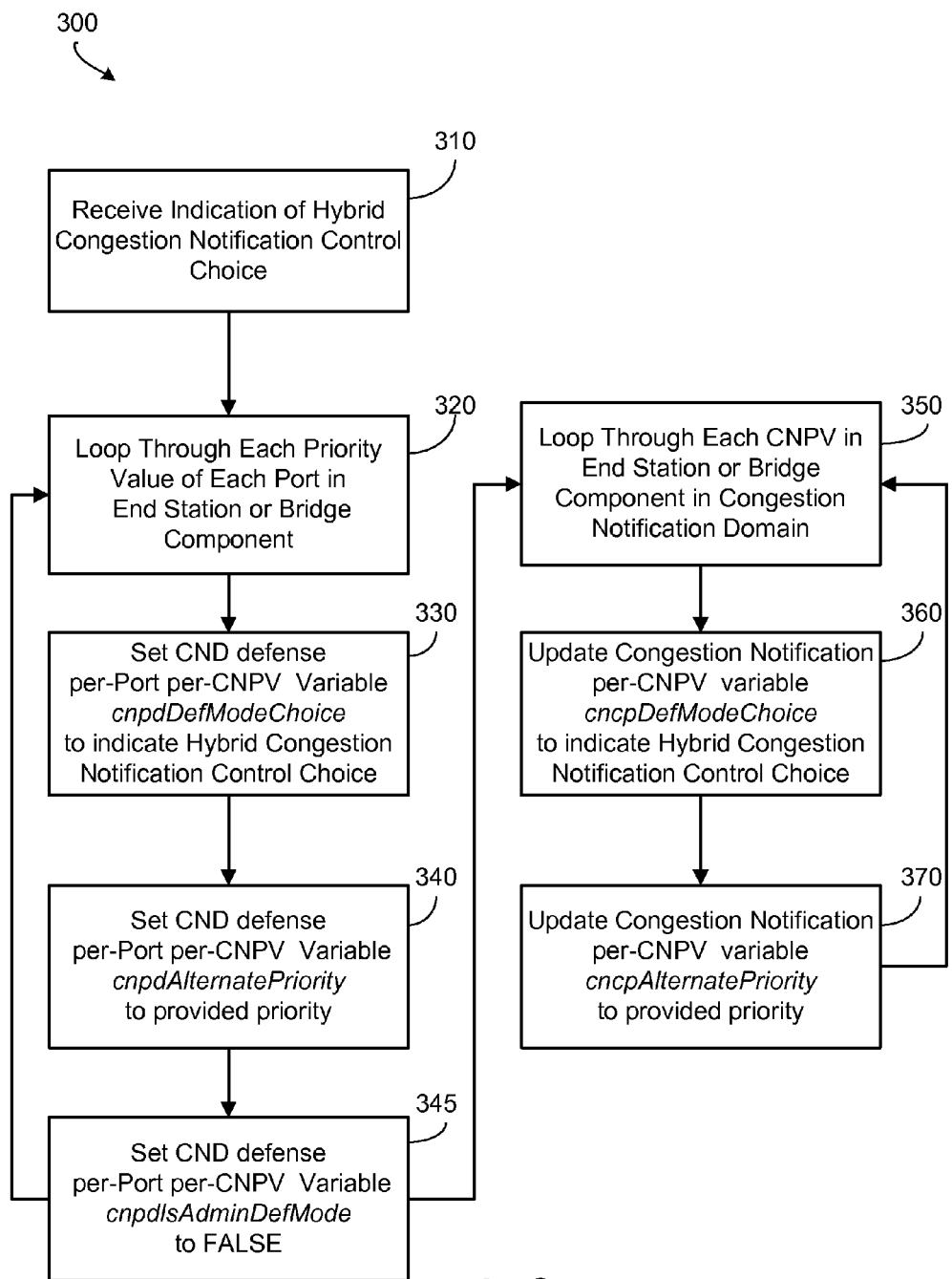
FIG. 3 is a flowchart illustrating steps performed by congestion-aware devices upon receiving an indication a hybrid congestion notification control choice has been selected, in accordance with an embodiment of the present invention.

Now referring to FIG. 3, a flowchart 300 illustrating steps performed by congestion-aware devices 105, 120, 120e (FIG. 1) in the CND 170 (FIG. 1) upon receiving an indication a "hybrid" congestion notification control choice has been selected by a network administrator 150, in accordance with an embodiment of the present invention.

In an embodiment of the present invention, the devices 105, 120, 120e may receive, at 310, an indication, either directly or indirectly, that the network administrator 150 (FIG. 1) may have selected the congestion notification control choice option "hybrid" and provided an alternate priority value. The congestion-aware devices 105, 120 120e (FIG. 1) may set appropriate component and local variables in support of the "hybrid" option to indicate defense mode definitions are to be set automatically (using LLDP), but the alternate priority is to be set to the value provided by the network administrator 150 (FIG. 1).

End station devices and bridge component devices 105, 120, 120e (FIG. 1) may set local variables by looping, at 320, through each port and each priority value on each port. For each priority value for each port (per-port per-CNPV), the devices 105, 120, 120e (FIG. 1) may set, at 330, the cnpdDefModeChoice variable to an exemplary value cpcHybrid, indicating a "hybrid" congestion notification control choice option may have been selected by the network administrator 150 (FIG. 1). The device 105, 120, 120e (FIG. 1) may additionally set, at 340, the per-port per-CVPV variable cnpdAlternatePriority to the alternate priority value provided by the network administrator 150 (FIG. 1) and, at 345, the per-port per-priority variable cnpdlsAdminDefMode to the Boolean value of FALSE.

End station devices and bridge component devices 105, 120, 120*e* (FIG. 1) may set component variables by looping, at 350, through each priority value. For each priority value (per-CNPV), the devices 105, 120 120*e* (FIG. 1) may set, at 360, the cncpDefModeChoice variable to an exemplary value cpcHybrid, indicating a "hybrid" congestion notification control choice option may have been selected by the network administrator 150 (FIG. 1). The device 105, 120, 120*e* (FIG. 1) may additionally set, at 370, the per-port per-CVPV variable cncpAlternatePriority to the alternate priority value provided by the network administrator 150 (FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
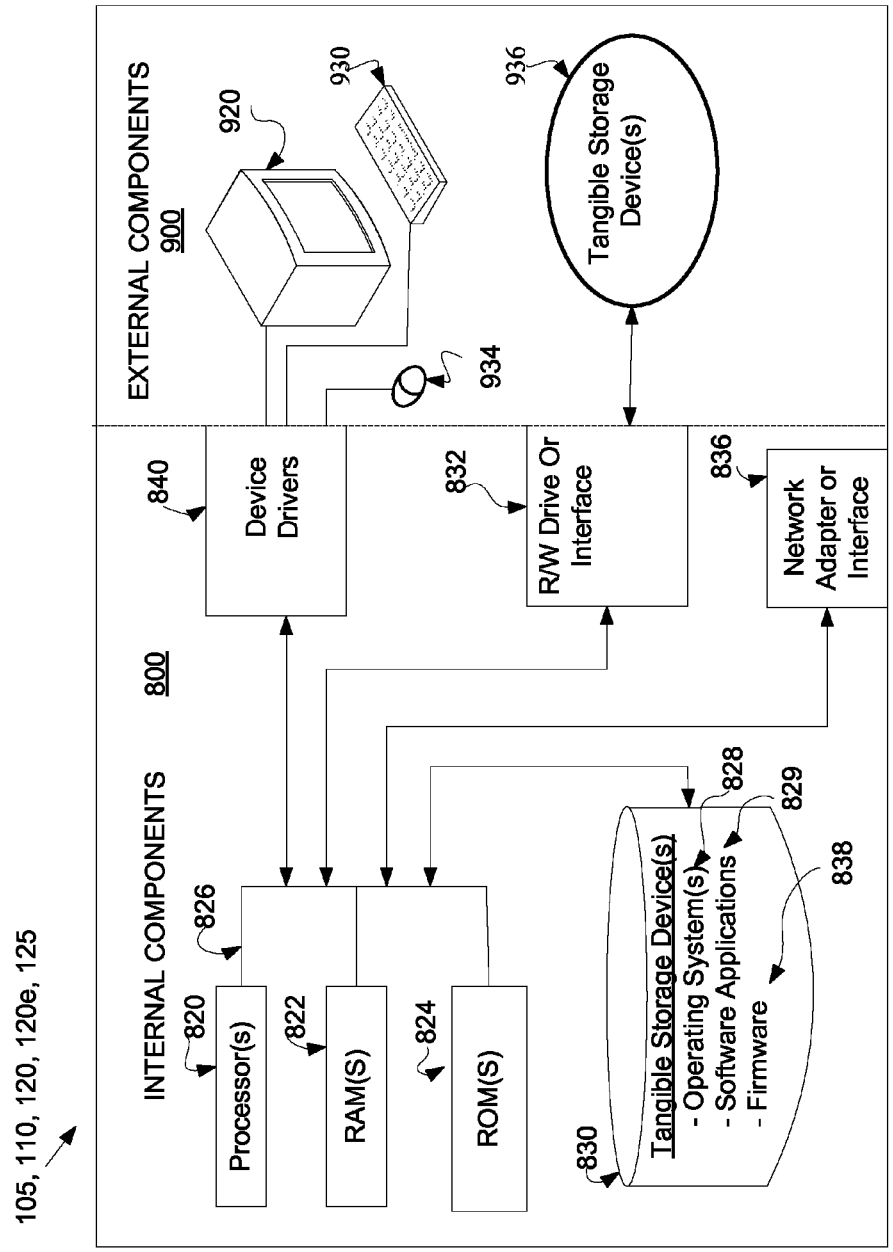
FIG. 4 is a schematic block diagram which illustrates internal and external components within the computing device(s) of FIG. 1 in accordance with an illustrative embodiment.

Referring now to FIG. 4, computing devices 105, 110, 120, 120*e*, and 125 (FIG. 1) may include respective sets of internal components 800 and external components 900. Each of the sets of internal components 800 includes one or more processors 820; one or more computer-readable RAMs 822; one or more computer-readable ROMs 824 on one or more buses 826; one or more operating systems 828; one or more software applications 829; and one or more computer-readable tangible storage devices 830. The one or more operating systems 828 and programs in respective computing devices 105, 110, 120, 120*e*, and 125 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information. The term "computer readable tangible storage device" does not encompass a signal propagation medium such as a copper cable, optical fiber, or wireless transmission medium.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The firmware 838 and operating system 828 that are associated with computing devices 105, 110, 120, 120e, and 125 (FIG. 1), can be downloaded to computing devices 105, 110, 120, 120e, and 125 (FIG. 1) from an external computer (e.g., server) via a network (for example, the Internet, a local area network or other, wide area network) and respective network adapters or interfaces 836. From the network adapters (or switch port adapters) or interfaces 836, the firmware 838 and operating system 828 associated with computing devices 105, 110, 120, 120e, and 125 (FIG. 1) are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method to extend Quantized Congestion Notification protocol comprising:
    receiving a signal, wherein the signal activates Quantized Congestion Notification with a hybrid congestion notification control choice, the signal additionally comprising an alternate priority value;
    setting a per-port per-priority protocol variable and a per-device per-Congestion-Notification-Priority-Value protocol variable to automatically assign a defense mode; and
    setting a per-port per-priority protocol variable and a per-device per-Congestion-Notification-Priority-Value protocol variable to manually assign an alternate priority value.

2. The method of claim 1, wherein the setting the per-port per-priority protocol variable comprises setting a variable cnpdDefModeChoice, a variable cnpdAlternatePriority and a variable cnpdIsAdminDefMode.

3. The method of claim 2, wherein the variable cnpdDefModeChoice is set to a value of cpcHybrid, the value cpcHybrid indicates the hybrid congestion notification control choice is signaled.

4. The method of claim 2, wherein the variable cnpdAlternatePriority is set to the alternate priority value received with the signal.

5. The method of claim 2, wherein the variable cnpdIsAdminDefMode is set to a Boolean value of FALSE.

6. The method of claim 1, wherein the setting the per-device per-Congestion-Notification-Priority-Value protocol variable comprises setting a variable cncpDefModeChoice and a variable cncpAlternatePriority.

7. The method of claim 6, wherein the variable cncpDefModeChoice is set to a value of cpcHybrid, the value cpcHybrid indicates the hybrid congestion notification control choice is signaled.

8. The method of claim 6, wherein the variable cncpAlternatePriority is set to the alternate priority value received with the signal.

9. A computer program product to extend Quantized Congestion Notification protocol, the computer program product comprising one or more computer-readable tangible storage devices and program instructions stored on at least one of the one or more computer-readable tangible storage devices, the program instructions comprising:
    program instructions to receive a signal, wherein the signal activates Quantized Congestion Notification with a hybrid congestion notification control choice, the signal additionally comprising an alternate priority value;
    program instructions to set a per-port per-priority protocol variable and a per-device per-Congestion-Notification-Priority-Value protocol variable to automatically assign a defense mode; and
    program instructions to set a per-port per-priority protocol variable and a per-device per-Congestion-Notification-Priority-Value protocol variable to manually assign an alternate priority value.

10. The computer program product of claim 9, wherein the program instructions to set the per-port per-priority protocol variable comprise program instructions to set a variable cnpdDefModeChoice, a variable cnpdAlternatePriority and a variable cnpdIsAdminDefMode.

11. The computer program product of claim 10, wherein the program instructions set variable cnpdDefModeChoice to a value of cpcHybrid, the value cpcHybrid indicates the hybrid congestion notification control choice is signaled.

12. The computer program product of claim 10, wherein the program instructions set variable cnpdAlternatePriority value to the alternate priority value received with the signal.

13. The computer program product of claim 10, wherein the program instructions set variable cnpdIsAdminDefMode to a Boolean value of FALSE.

14. The computer program product of claim 9, wherein the program instructions to set the per-device per-Congestion-Notification-Priority-Value protocol variable comprise program instructions to set a variable cncpDefModeChoice and a variable cncpAlternatePriority.

15. The computer program product of claim 14, wherein the program instructions set variable cncpDefModeChoice to a value of cpcHybrid, the value cpcHybrid indicates the hybrid congestion notification control choice is signaled.

16. The computer program product of claim 14, wherein the program instructions set variable cncpAlternatePriority to the alternate priority value received with the signal.

17. A computer system to extend Quantized Congestion Notification protocol, the computer system comprising one or more processors, one or more computer readable memories, one or more computer readable tangible storage devices, and program instructions stored on at least one of the one or more storage devices for execution by at least one of the one or more processors via at least one of the one or more memories, the program instructions comprising:

program instructions to receive a signal, wherein the signal activates Quantized Congestion Notification with a hybrid congestion notification control choice, the signal additionally comprising an alternate priority value;

program instructions to set a per-port per-priority protocol variable and a per-device per-Congestion-Notification-Priority-Value protocol variable to automatically assign a defense mode; and program instructions to set a per-port per-priority protocol variable and a per-device per-Congestion-Notification-Priority-Value protocol variable to manually assign an alternate priority value.

18. The computer system of claim 17, wherein the program instructions to set the per-port per-priority protocol variable comprise program instructions to set a variable cnpdDefModeChoice to a value of cpcHybrid, the value cpcHybrid indicating the hybrid congestion notification control choice is signaled; program instructions to set a variable cnpdAlternatePriority to the alternate priority value received with the signal; and program instructions to set a variable cnpdIsAdminDefMode to a Boolean value of FALSE.

19. The computer system of claim 17, wherein the program instructions to set the per-device per-Congestion-Notification-Priority-Value protocol variable comprise program instructions to set a variable cncpDefModeChoice to a value of cpcHybrid, indicating the hybrid congestion notification control choice is signaled.

20. The computer system of claim 17, wherein the program instructions to set the per-device per-Congestion-Notification-Priority-Value protocol variable comprise program instructions to set a variable cncpAlternatePriority to the alternate priority value received with the signal.

* * * * *